Figure 1:
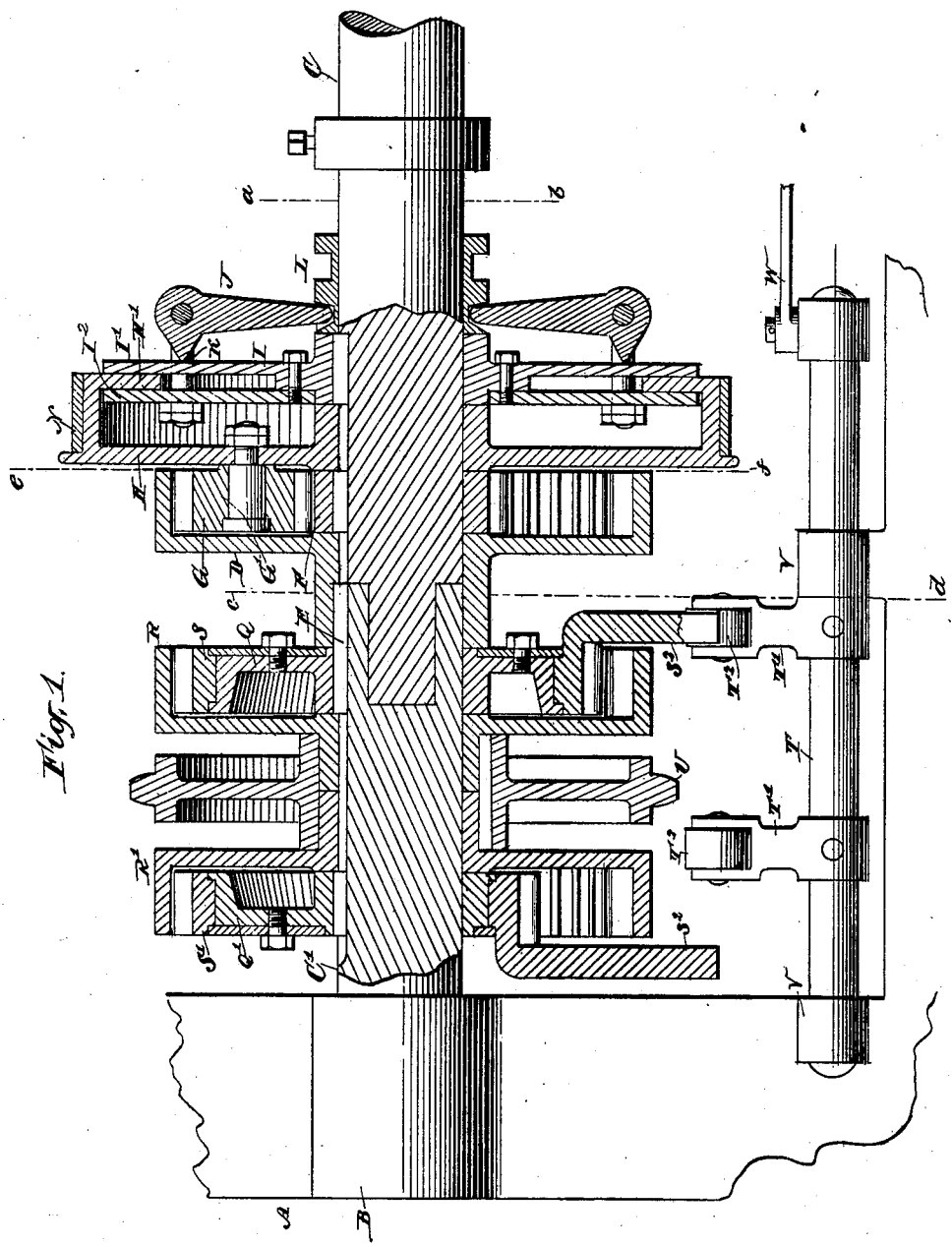

No. 697,573. Patented Apr. 15, 1902.
H. TUTTLE.
MOTION TRANSMITTER.
(Application filed June 29, 1901.)

(No Model.) 3 Sheets—Sheet 1.

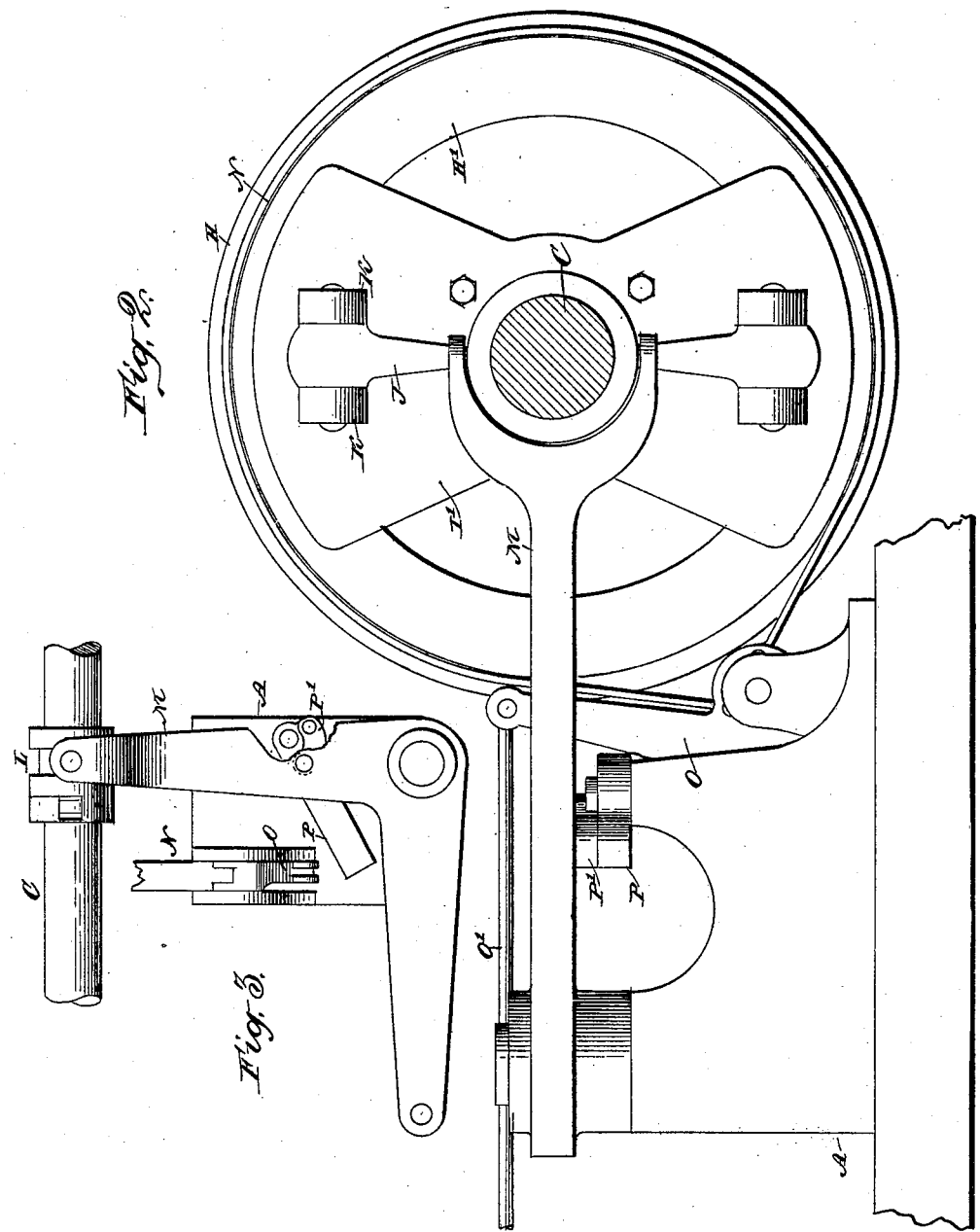

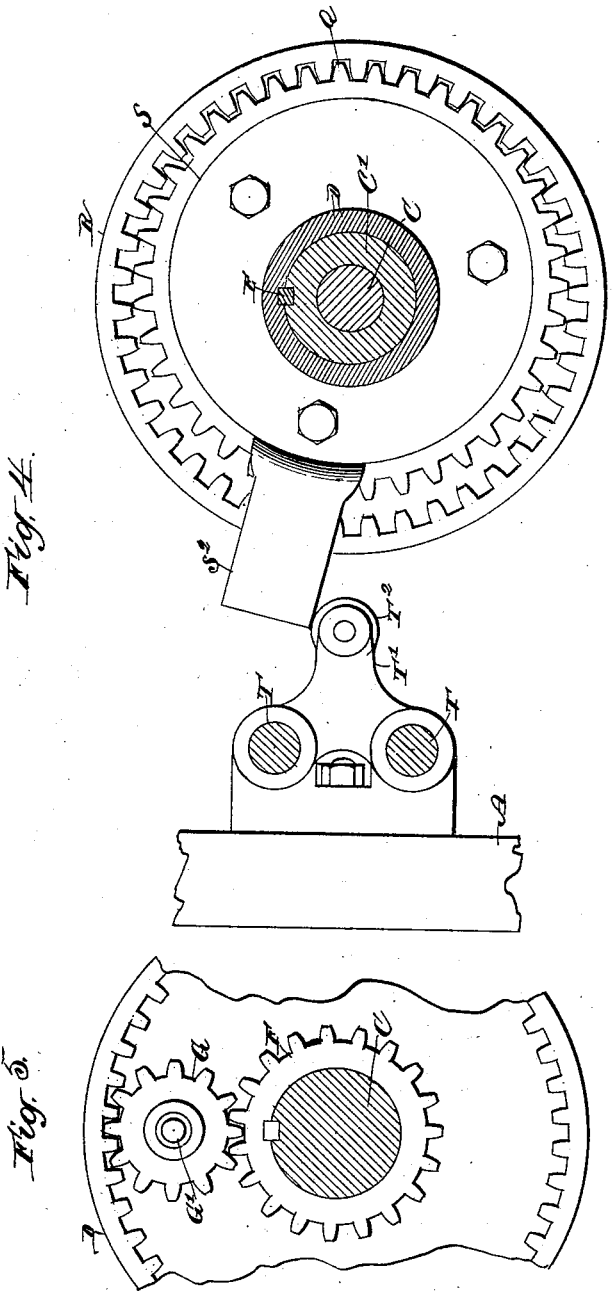

UNITED STATES PATENT OFFICE.

HOSMER TUTTLE, OF CEDAR RAPIDS, IOWA.

MOTION-TRANSMITTER.

SPECIFICATION forming part of Letters Patent No. 697,573, dated April 15, 1902.

Application filed June 29, 1901. Serial No. 66,474. (No model.)

*To all whom it may concern:*

Be it known that I, HOSMER TUTTLE, a citizen of the United States, residing at Cedar Rapids, in the county of Linn and State of Iowa, have invented certain new and useful Improvements in Motion-Transmitters, of which the following is a specification.

The object of this invention is to produce a motion-transmitter of simple construction by means of which rotary motion may be transmitted at variable speeds, reversed, and arrested at will.

The invention is more especially applicable to such purposes as the communication of motion from a motor to road-vehicles commonly known as "automobiles," though it may be employed for many other purposes where the conditions are analogous.

The nature of the invention will clearly appear from the description and claims following, reference being had to the accompanying drawings, in which—

Figure 1 is a central horizontal section illustrating mechanism embodying the invention, but without the shifting apparatus. Fig. 2 is a view of the clutch and brake with their immediate connections as seen from line $ab$, Fig. 1. As above stated, however, the shifting levers are not shown in Fig. 1. Fig. 3 is a plain view showing the clutch and brake levers. Fig. 4 is a view of one of a pair of reducing-gears and their connections as seen from the line $cd$ looking to the left. Fig. 5 is a similar view of the reversing-gear as seen from the line $ef$.

In the drawings, A designates a suitable supporting-frame for the gearing, the form of which will vary according to circumstances. This has bearing B for the main shaft C C', only one bearing being indicated.

C is the main driving-shaft, which may communicate directly or indirectly with a motor. (Not shown.) C' is a connected shaft in alinement therewith, but adapted to turn independently of the main shaft. They are preferably connected by socket and dowel, as shown in Fig. 1, to give bearing in addition to the hub of the gear D, which encircles the ends of both shafts and is keyed to one of them at E.

To the shaft C, adjacent to the hub of the gear D, is keyed a small gear F. Between this and the teeth of the internal gear D is mounted a pinion G on a stud G', secured to the web of a friction-disk H, loosely mounted on the same shaft. Adjacent to the hub of this disk is keyed a driver I, the forked webs I' and I² of which are made to close on the annular flange H' by cams J, pivoted to adjusting-bolts K and actuated by a sleeve L, which is moved by a hand or foot lever M. It will be understood that normally the forks of the driver spring away from the flange H' slightly, and the disk H may then turn freely on the shaft.

I make no claim to the clutch specifically, it being an efficient device in common use.

The rim of the friction-wheel H is provided with a brake N, connecting with a lever O, which may be controlled by a suitable shift-rod O'. It is important, however, that the brake and clutch be not in engagement at the same time, as this would lock the mechanism and bring an extraordinary twisting strain on the shaft C from the motor, which is supposed to be running continuously. Provision is therefore made for automatically throwing off the brake whenever the clutch is engaged. This mechanism is shown in Figs. 2 and 3. To the supporting-frame is pivoted a short lever P, the free arm of which is adapted to strike the back side of the lever O in the arc of its movement, and thus disengage the brake. The lever P is connected with the lever M by a link P', so that as the lever is thrown to engage the clutch the lever P is forced into engagement with the brake-lever and the brake is disengaged. The brake may, however, be applied independently of the clutch-lever when the clutch is disengaged, as will be evident.

To the shaft C', adjacent to the hub of the gear D, is keyed an eccentric Q, and at some distance therefrom, separated by the hubs of two internal gears R and R', is keyed another of greater eccentricity, Q'. On these eccentrics are mounted annular gears S and S', respectively, which engage the respective internal gears at their greater radii, as shown in Fig. 4. To each annular gear connects a tail or extension S², by which the axial revolution of these gears may be arrested alternately, and they may then be carried by the eccentrics in an orbital path corresponding to the eccentricity of the eccentric in either case. The device for holding said gears comprises a slide T, provided with arms T', provided with antifriction-rollers T², on which the tails or extension-arms S² may ride back and forth as the eccentric moves in its orbital path. These intercepting-rollers are so spaced as that both cannot possibly engage eccentric arms at the same time, and thus lock the mechanism. At their intermediate position neither such arm is intercepted, and as the gears R and R' are mounted loosely on the shaft C' no motion is communicated to them. On the hubs of these gears R and R' is keyed a sprocket U, by means of which motion is transmitted to adjacent mechanism through the medium of a link belt. (Not shown.) The movement of the slide T is limited by its bearings V, and it is shifted by a suitable link W, communicating with a hand or foot lever. (Not shown.)

The action of the apparatus is as follows: Supposing that the mechanism is applied to an automobile, the operator sets the gear-stops T² at the intermediate position—that is to say, referring to Fig. 1, to the left of the position shown—far enough so as to intercept neither gear-arm. The shafts C and C' may then both revolve freely with all their connected mechanism; but no motion will be imparted to the sprocket U. He then starts the motor, running it up to speed or not, at pleasure. He may then shift the slide to the right to intercept the slower-running drive-gear and afterward engage the friction-clutch, when the vehicle will move forward at its slower speed. If then he wishes to increase the speed, he throws the slide over to its other limit, intercepting the faster drive-gear. To stop, he has simply to move the gear-stops to the original intermediate position. Should he wish to back his vehicle, he disengages the friction-clutch, moves the gear-stop to intercept either arm, and sets the brake. This holds the friction-wheel from turning, whereupon a reverse motion is transmitted to the shaft C' and its connected gearing through the medium of the gears F and D and the intermediate pinion G. In changing from one speed to another while in motion or in starting from a dead-stop the operator should loose the friction-clutch a little, so as to avoid shock as the drive-gears engage. By so doing the machine may be started from a stop by first engaging the friction-clutch and then throwing in the gear-stop, the slip of the friction-clutch preventing undue shock or strain.

Having thus described my invention, what I claim as new, and desire to secure by Letters Patent, is—

1. In a motion-transmitter, the combination with a rotating shaft, of a pair of gears loosely mounted thereon, a driver, secured to said gears, annular gears of different diameters adapted to engage said gears, means for alternately holding the annular gears from revolving axially, and means, for imparting an orbital movement to said annular gears and causing a revolution at a different rate of speed of the engaging gears.

2. The combination with a rotating shaft, of a plurality of driving-gears loosely mounted thereon, annular gears of different diameters mounted to mesh therewith, and having each a radial arm projecting beyond the path of said annular gear, and a sliding stop adapted to be moved in or out of the path of said arms, and alternately prevent the axial turning of the annular gears, and eccentrics fast to said shaft, on which the annular gears are mounted, substantially as and for the purpose set forth.

3. The combination with a rotating shaft, internal gears mounted revolubly thereon, eccentrics fast to said shaft, and annular gears mounted revolubly on said eccentrics and adapted to engage the internal gears at their longer radii, with arms extending beyond the paths of said gears, of intercepting-stops to hold said arms, with antifriction-rollers thereon to take the reciprocating movement of the arms.

4. The combination of a rotating shaft, internal driving-gears mounted revolubly thereon, eccentrics secured to said shaft, annular gears mounted on said eccentrics and partially meshing with the internal gears, and means for preventing the annular gears from turning, of a second shaft carrying a friction-clutch adapted to connect the driving mechanism of both shafts intermittently, substantially as described.

In testimony whereof I affix my signature in presence of two witnesses.

HOSMER TUTTLE.

Witnesses:
J. H. ENGLISH,
M. H. BURTON.